United States Patent [19]
Wissmach et al.

[11] Patent Number: 5,635,806
[45] Date of Patent: Jun. 3, 1997

[54] METHOD AND APPARATUS FOR TEMPERATURE MONITORING OF UNIVERSAL OR AC/DC MOTORS

[75] Inventors: Walter Wissmach; Wolfgang Millauer, both of München, Germany

[73] Assignee: Hilti Aktiengesellschaft, Fürstentum, Liechtenstein

[21] Appl. No.: 579,390

[22] Filed: Dec. 27, 1995

[30] Foreign Application Priority Data

Dec. 29, 1994 [DE] Germany .................... 44 47 145.9

[51] Int. Cl.$^6$ .................................................. H02K 23/00
[52] U.S. Cl. .......................... 318/245; 318/799; 361/25
[58] Field of Search ........................... 318/634, 783, 318/788, 791, 798, 799, 801, 809, 254, 439, 138, 437, 246, 471; 73/862.623, 862.68, 204, 14, 862, 193; 324/158 MG; 361/23, 25; 388/934

[56] References Cited

U.S. PATENT DOCUMENTS

| | | | |
|---|---|---|---|
| 3,736,479 | 5/1973 | Soeda | 318/480 X |
| 3,794,898 | 2/1974 | Gross | 388/934 |
| 4,119,895 | 10/1978 | Müller | 318/254 |
| 4,157,036 | 6/1979 | Kivenson | 73/59 |
| 4,163,181 | 7/1979 | Farber | 388/934 |
| 4,195,254 | 3/1980 | Gurwicz . | |
| 4,441,065 | 4/1984 | Bayer et al. | 318/808 |
| 4,503,370 | 3/1985 | Cuneo . | |
| 4,618,805 | 10/1986 | Hornung | 318/432 |

FOREIGN PATENT DOCUMENTS 0584615  3/1994  European Pat. Off. .

*Primary Examiner*—Jonathan Wysocki
*Attorney, Agent, or Firm*—Anderson Kill & Olick P.C.

[57] ABSTRACT

The method and the arrangement for temperature monitoring of universal motors based upon a resistance measurement of a field winding, wherein a DC current component of low magnitude is superimposed upon the motor current for elimination of the complex values of the AC current impedance, and wherein the voltage drop in the field winding is amplified and freed from the AC voltage component and is compared as a DC voltage component proportional to the ohmic resistance of the field winding to a temperature independent DC voltage component, which is obtained in an analogous manner from a current measuring shunt, through which the motor AC current, including the superimposed DC current component, flows.

6 Claims, 1 Drawing Sheet

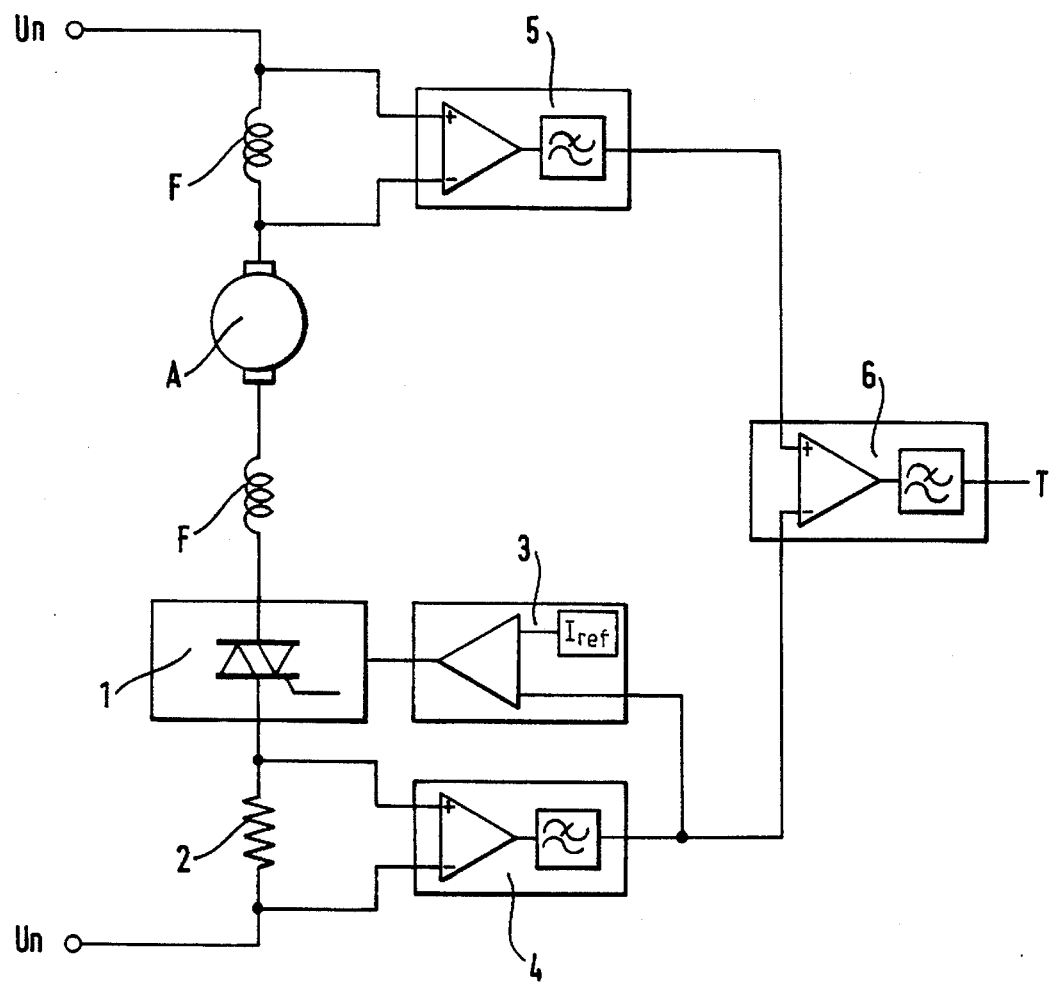

METHOD AND APPARATUS FOR TEMPERATURE MONITORING OF UNIVERSAL OR AC/DC MOTORS

FIELD OF THE INVENTION

The invention deals with a method and an arrangement for temperature monitoring of AC/DC motors, which comprise at least one field winding in series with an armature.

BACKGROUND OF THE INVENTION

In universal motors, particularly in electric tools, there is the danger of overheating through excessive loading which can lead to irreversible motor damage.

This danger of overheating is usually countered by switching the motor current off, if a temperature limit is exceeded, or by reducing said current to values presenting no danger. For this the temperature of the motor winding must either be directly measured by means of a temperature sensor, for instance, a positive temperature coefficient (PTC) resistance wound into the winding or it must be indirectly determined from magnitudes which can be handled by measurement technology, for instance, by means of a cooling shunt.

The direct measuring method has the advantage of high precision. It is, however fraught with a high expenditure of additional component costs, installation work and separate wiring. Indirect methods avoid this effort as a rule. They have, however, the disadvantage of being somewhat imprecise and, above all, they cannot reproduce the true motor temperature with sufficient accuracy, above all, because of inherent time delays.

With direct measuring methods, such as those with a measuring sensor or sensors, there are known, for instance, heat sensor elements such as positive temperature coefficient- and negative temperature coefficient resistors or thermal contacts attached to the motor windings (mostly at the or the plurality of the starter windings), whose respective output signals are evaluated.

Measuring methods without measuring sensors are also used as direct measuring methods, which include a known, if however, not very widespread method, to measure the ohmic resistance of at least one motor winding, which constitutes a nearly directly proportional measurement for its temperature. Resistor measurement methods of this type are known in many variants and are described in the professional literature. It is, however, difficult to apply this method to AC motors, because in this case, ohmic resistance must be differentiated from the AC current impedance.

In the indirect temperature measuring method, equipment-modifying, as well as computerized methods, are known.

With the equipment-modifying methods, it is attempted to determine the motor temperature by suitable cross-switched electronic and/or electric components, from which a signal corresponding to the motor temperature can be tapped. Usually, the current flowing through the motor and/or the applied voltage is processed for this purpose. The simplest and mostly widespread type is the use of a thermal circuit breaker, which is wired in series with the motor and which is heated by the motor. When a limit temperature is exceeded, a contact opens and interrupts the current circuit.

In this connection, a method is, for instance, also known to the effect of having the motor current flow through a heating resistance, which is in thermal contact with a temperature sensitive component and which is dimensioned, in such a way, that the absolute value as well as the chronological course of its temperature corresponds to the best possible degree to the motor temperature. By arranging the heating resistance in the motor cooling airflow, another refinement of the method can be achieved.

In the computerized methods, motor temperature is, as a rule, reconstructed with the help of a thermal model. Herein, easily measured magnitudes, such as voltage, current, rpm and/or phase operating angles are processed in such a way by means of a digital computer (frequently a microcontroller), that output data is indicative of the motor temperature. In this connection, methods are known which utilize empirically determined, motor specific, stored characteristic field tables (compare DE 31 11 818 A1), as well as those which compute closed mathematical models (compare DE 31 07 123 A1).

SUMMARY OF THE INVENTION

The invention is based upon the task of indicating a direct measuring method based upon measuring a resistance or an apparatus suitable for performing said measuring method, by means of which a precisely reproducible data corresponding to the operational temperature of universal motors (AC/DC motors) can be obtained, especially for motors which are used in electrically driven tools.

In a method for temperature monitoring of universal motors, the invention is characterized in that a direct current component having a lower value, compared to the effective AC current component, is superimposed upon the motor AC current, wherein the voltage drop is determined at a field winding of the motor, is then relieved of its AC current share. After having been processed in this way, said voltage drop in its capacity of a DC voltage component, proportional to the temperature dependent ohmic resistance of the field winding, is compared to a temperature-invariable DC voltage component. This component is obtained in an analogous manner by means of a current measuring shunt, through which the motor AC current, including the superimposed DC current, component flow.

Compared to the known resistance measurement methods, the temperature monitoring method, according to the invention, has the advantages that, on the one hand, the standard temperature can be measured very accurately and especially without specific measurement sensors. On the other hand, the resistance measurement method in the invention can be ideally combined with existing and known phase operating angle controls.

The mode of operation of the method is based upon a resistance measurement of one of the usually two field windings. In order to overcome the difficulty of having to use the mere alternating current flowing through the motor for this purpose, a low DC current share is superimposed over said motor current. This DC current share causes a DC voltage drop $U_{fdc}$ at the field winding which, if the DC current $I_{dc}$ is known, is directly proportional to the ohmic resistance $R_f$ of the field winding and thus to the temperature:

$$U_{fdc} = I_{dc} \cdot R_f$$

This DC voltage drop can be measured and, further, processed in a relatively simple manner.

The circuitry means necessary for the realization of the method in the invention are largely contained in customary motor electronics. Additional design effort consists only in an additional field winding connection to the control and regulation-electronics. In addition, assembly effort is not required.

An inventive arrangement for temperature monitoring of universal motors, with at least one field winding in series with an armature, is characterized by a first electronic unit which superimposes a DC current component of lower magnitude compared to the effective AC current component of the motor current, upon the motor current flowing through the field winding and the armature; a second electronic unit, which determines the voltage of the field winding and which eliminates the AC voltage component and delivers an equal magnitude corresponding to the temperature dependent ohmic resistance of the field winding to a first input of a comparator; and a current measurement shunt, which does not vary with temperature, through which flows the motor current including the superimposed DC current component, with a voltage being able to be tapped from said current measuring shunt by a third electronic component, which voltage after elimination of the AC voltage share can be directed to a second input of the comparator as a comparative equal magnitude, with the output of the comparator providing a signal changing with the temperature of the field winding.

The superimposed DC current component is preferably kept constant by means of an integrated current regulator which is coupled to the phase operating angle control and to which the acquired comparative equal magnitude as an actual value is applied.

The second and third electronic units are preferably formed as a voltage amplifier, which is acted upon on its input side by the voltage which can be tapped from the field winding on the one hand and the current measurement shunt on the other hand and which is coupled to a filtering unit for the purpose of eliminating the AC current component.

Accordingly, it is an object of the present invention to provide a method and apparatus for temperature monitoring of universal or AC/DC motors which is based upon the task of creating a direct measuring method based upon measuring a resistance and an apparatus suitable for performing said measuring method, by means of which a precisely reproducible data corresponding to the operational temperature of universal motors (AC/DC motors) can be obtained, especially for motors which are used in electrically driven tools.

Other objects and advantages of the present invention will be apparent to those skilled in the art upon a review of the Description of the Preferred Embodiment taken in conjunction with the Drawings which follow.

BRIEF DESCRIPTION OF THE DRAWINGS

FIG. 1 illustrates a circuit diagram of a circuit arrangement for temperature monitoring of universal motors according to the present invention.

DESCRIPTION OF THE PREFERRED EMBODIMENT

FIG. 1 illustrates a basic circuit diagram which shows an AC current universal motor with an armature A and the field windings F as well as a phase operating angle control 1, as it is customarily used, in order to change or regulate the rpm of a motor. Further, a current measuring shunt 2 is located in the motor current circuit, which can be integrated into the component of the phase operating angle control 1. As a rule, all of these elements or components already exist in an electric tool. Power supply terminals are designated by Un.

The arrangement of FIG. 1 is supplemented in the invention by a current regulator 3 which superimposes a DC current component of smaller, but constant magnitude, upon the motor AC current, which will be explained in detail below. The regulator 3 is acted upon at the input by an actual current value derived from the current measurement shunt 2, which has been freed from the AC current share after amplification and filtering in a filter-amplifier 4.

The voltage drop at one of the two field windings F is measured, in a manner similar to that at the current measuring shunt 2, by means of a field voltage amplifier filter 5. The AC voltage component is eliminated by the filtering and there remains DC voltage share generated by the superimposed DC current, which DC voltage share is directly proportional to the DC current and to the ohmic resistance of the field winding F.

If one now compares the DC voltage drops at the non-variable temperature of the temperature measuring shunt 2 and the temperature dependent field winding F by means of a comparator 6, then one obtains a switching signal T, if a suitable selection of the amplifier factors has been made, which displays that a specific preselectable temperature of the field winding F has been reached. This switching signal can be processed further in the most different ways, for instance, into an optical or acoustical warning display for switching the apparatus off and/or for limiting the motor current to a non-critical value.

The individual components of the circuit arrangement are described in detail below.

The phase operating angle control 1 consists, as a rule, of a triac (bi-directional thyristor triode) and the associated actuation circuit which, depending upon a control value, predetermines the firing angle of the triac and, with this, the effective motor voltage. The control value can, on its part, be an output value of an rpm- and/or current regulator. For the actuation circuit, there exists a plurality of embodiment forms well known to the specialist versed in the art in the form of discrete circuit buildups or as integrated circuits.

The current measuring shunt 2 consists, as a rule, of a relatively low ohmic resistance, in which a measuring voltage directly proportional to the motor current is degraded. Usually, metal alloys, properties of which substantially do not change with a change in temperature, for instance, constantan and similar known materials, are used as resistor material.

The current regulator 3 is not absolutely necessary for the functioning of the invented temperature monitoring. This is because the DC voltage drops in the current measuring shunt 2 and at the field winding F are compared, meaning subtracted, in the comparator 6. Therefore, the circuit operates within reasonable limits basically independently of the magnitude of the DC current component. Difficulties, however, can arise at the selection or rejection boundaries, or modulation range, of the phase operating angle control 1 and in specific conceivable loading cases, in particular, at very low motor voltages or in case of full motor voltage. In this case, it is difficult to obtain a sufficiently high DC current component. A simple, however not the only, possibility of circumventing this difficulty consists in keeping the DC current constant at a sufficiently high, however compared to the AC current low, value. This is assured by the current regulator 3, which compares a predeterminable, constant actual value $I_{ref}$ to the DC voltage—actual value (DC-Actual Value) supplied by the shunt voltage amplifier and filter 4. Depending on the difference resulting therefrom, a control signal is formed, which causes an increase or a decrease of the DC current component in the phase operating angle control 1.

The circuit group of the filter amplifier 4 (shunt voltage amplifier and filter) consists operationally of two parts, namely, on the one hand of a low pass filter whose cut-off frequency is small compared to the power supply voltage frequency, so that the AC component of the motor current, or the associated measuring voltage, can be adequately dampened. On the other hand, this circuit group comprises an amplifier which amplifies the comparatively low DC signal for further processing in stages located downstream. As far as circuit technology is concerned, both of these objectives can be attained by an amplifier with a resistance/capacitance circuitry.

The circuit group of the field voltage amplifier and filter 5 is basically identical to the shunt voltage amplifier 4 described above as far as function and construction is concerned. Since the falling voltage component (AC as well as DC) are considerably greater than those at the current measuring shunt 2, the circuit technology layout of the amplifier circuitry elements must, however, be selected in a different manner. If the values are measured at the top field coil F, as is shown in FIG. 1, then, as a rule, a differential amplifier is necessary. It could, however, also be feasible to measure at the bottom field coil F, since the same current flows through both coils and since they are normally constructed identically. In such cases, one can do without a differential amplifier.

The comparator 6, with a timing unit, compares the DC voltage drops at the current measuring shunt 2 and the field winding F. Since an unavoidable residual ripple content exists in both signals in spite of filtering, a mere comparator would continuously switch back and forth in the vicinity of the switch-over point, meaning, where the limit temperature has been reached. In order to eliminate this, a low pass filter with a very low cut-off frequency is located downstream, as is shown in FIG. 1.

In an advantageous embodiment form for both circuitry parts, a subtracting integrator is used. It subtracts the two input signals and integrates the difference. The output signal assumes stationarily only two different states in spite of the input signals containing ripples. These two different states correspond to the top or low rejection or selection boundary and, thus, the output signal can be further processed just like a binary signal. A further advantage of this operational group consists in not reacting immediately after attaining the temperature limit, but rather, to provide a desired time delay adapted to the drive unit to be protected, wherein a short-time overload is tolerated. The function of the time delay with short time overload can, however, also be achieved in a different manner, for instance, by utilizing a monostable flipflop.

It is evident that the described circuit arrangement influences in such a way the phase operating angle control, that the positive and negative voltage half-waves assume unequal magnitudes. As a result, a DC voltage component of the motor voltage entails a corresponding DC current component. An advantageous possibility to achieve this consists in making the firing angles for the triac in the phase operating control 1 (see the above explanation) for the positive and negative voltage half-waves (which are normally equal) unequal. In this connection, it is possible to influence a signal voltage which exists and is accessible in most phase operating angle controls, which signal voltage affects the firing angle. Other, if however less attractive, possibilities of producing the DC current component, consist in, for instance, blending out periodically entire half-waves of one polarity or to produce in the motor current paths different voltage drops for different current directions by means of suitable circuitry elements, such as zener diodes, diode-resistor combinations or the like.

While the present invention has been described and illustrated in a preferred embodiment, such is merely illustrative of the present invention and is not to be construed to be a limitation thereof. Accordingly the present invention encompasses any and all modifications, variations and/or alternate embodiments with the scope of the present invention being limited only by the claims which follow.

What is claimed is:

1. A method of temperature monitoring of a universal motor, comprising the steps of:

superimposing a DC current component of lower magnitude than the effective AC current component upon a motor AC current;

determining a voltage drop at one field winding of the motor; and freeing the voltage drop from an AC current component, and comparing it, in its capacity as a DC voltage component proportional to a temperature-dependent ohmic resistance of the field winding, to a DC voltage not sensitive to temperature component, which is obtained in an analogous manner from a current measuring shunt through which a motor AC current, including the superimposed DC current component flows.

2. An apparatus for temperature monitoring of universal motors with at least one field winding wired in series with an armature, comprising:

a first electronic unit which superimposes a DC current component of smaller magnitude than an effective AC current component of motor current, upon the motor current flowing through the field winding and the armature, a second electronic unit which determines a voltage of the field winding, severs an AC voltage component and supplies a DC voltage component corresponding to a temperature dependent ohmic resistance of the field winding to a first input of a comparator;

a current measuring shunt through which the motor current including the superimposed DC current component flows; and third electronic unit for tapping voltage from said current measuring shunt which voltage, after the AC voltage component has been severed therefrom, is applied as a comparison DC voltage component to a second input of the comparator which at its output generates a signal dependent from the temperature of the field winding.

3. The apparatus according to claim 2, wherein the first electronic unit comprises means for superimposing a constant DC current component upon the motor current.

4. The apparatus according to claim 2, wherein the second and third electronic units are formed each as a voltage amplifier with a filtering unit suitable for severing the AC current component.

5. The apparatus according to claim 2, wherein the comparator comprises a timing unit.

6. The apparatus according to claim 3 for universal motors with phase operational angle control, wherein the first electronic unit comprises a phase operational angle control and a current regulator for operating the phase operational angle control, which is fed with the comparison DC component, as determined by the third electronic unit as a set value, and wherein the constant DC current component is superimposed upon the motor current by the phase operational angle control.

* * * * *